UNITED STATES PATENT OFFICE.

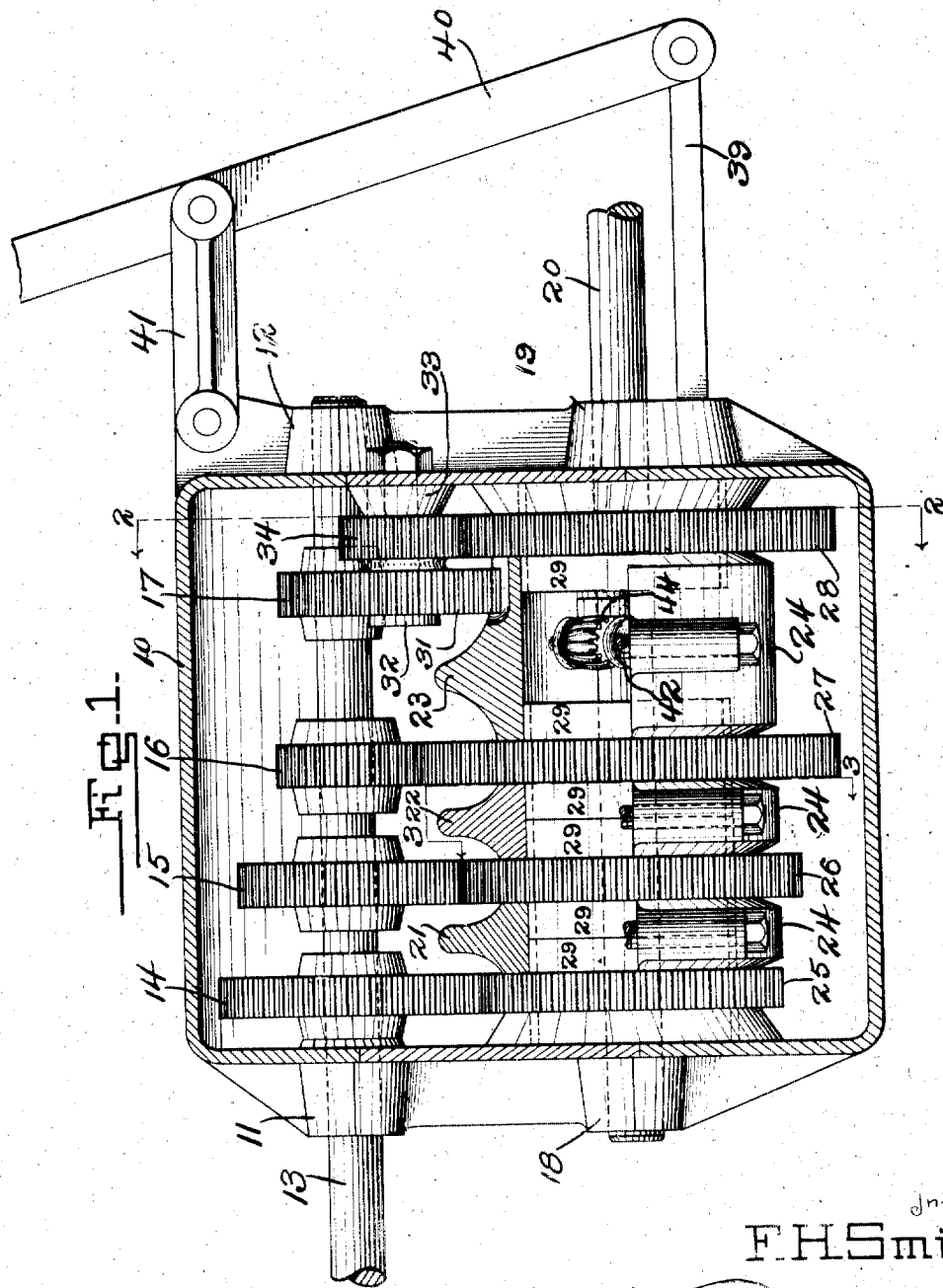

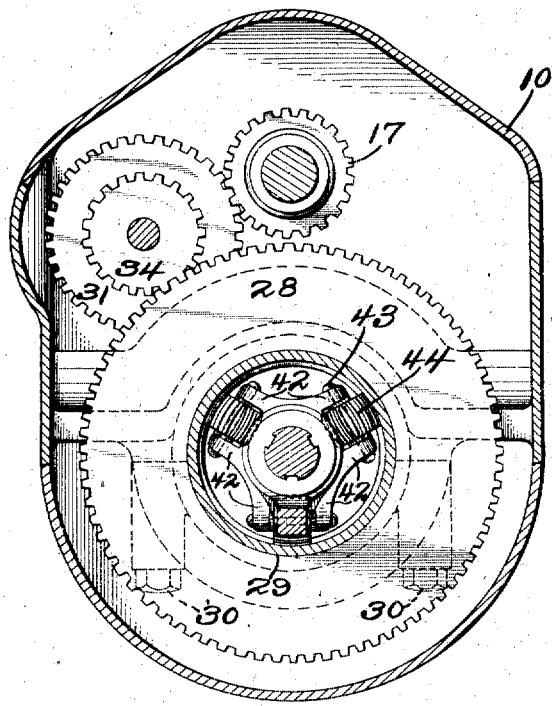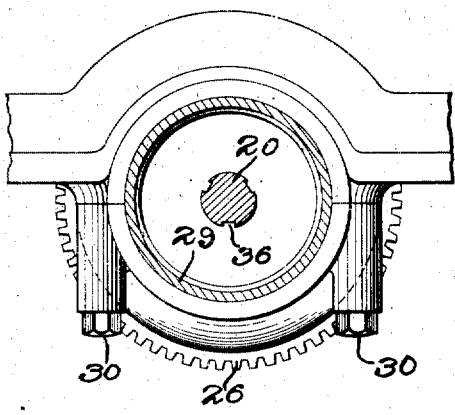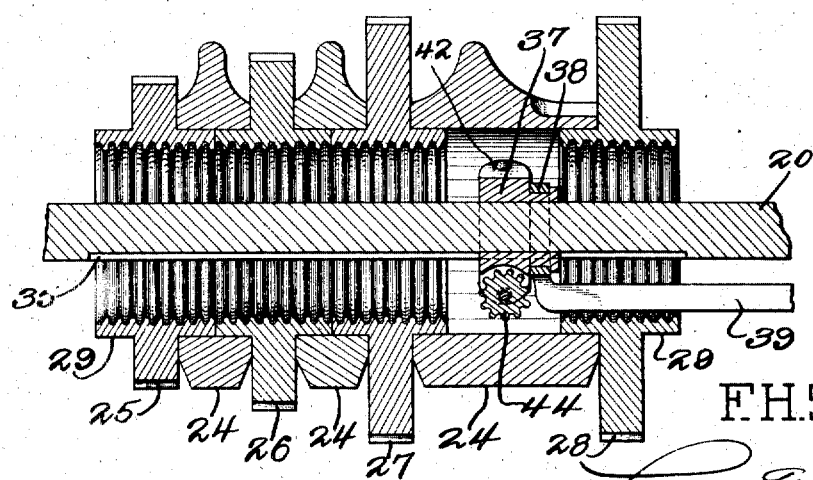

FRANK HEROLD SMITH, OF CLEVELAND, OHIO, ASSIGNOR OF ONE-HALF TO ROBERT R. FREER, OF CLEVELAND, OHIO.

TRANSMISSION MECHANISM.

1,278,241.     Specification of Letters Patent.     Patented Sept. 10, 1918.

Application filed August 15, 1917. Serial No. 186,381.

*To all whom it may concern:*

Be it known that I, FRANK HEROLD SMITH, a citizen of the United States, residing at Cleveland, in the county of Cuyahoga, State of Ohio, have invented certain new and useful Improvements in Transmission Mechanism, of which the following is a specification.

The present invention relates to transmission mechanism, more particularly adapted for connecting the drive and driven shafts at various relative speeds.

An object of the present invention is to provide a means of transmitting power from one shaft turning at a given speed to another shaft at any selective rate of speed without need of shifting any gears in or out of mesh; to provide for any required number of variations in speed, either forward or reverse; to permit the motion of an actuating lever to be confined to but two directions, either forward or reverse and always in the same plane; to avoid the destruction of gears resulting from the shifting of gears into and out of mesh; to permit a more rapid change from one speed to another than is possible by shifting gears.

Another object of the present invention is to prevent the passing from one extreme of speed to another extreme without passing through all intervening gradations of speed; to prevent the passing from a forward motion to the reverse without passing through neutral; to provide a mechanism which will automatically clutch the selective gear required to obtain the speed or motion desired without attention or effort on the part of the operator other than to move the operating lever to the position indicated to obtain such speed or motion.

The above, and various other objects and advantages of this invention will be in part described, and in part understood, from the following detailed description of the present preferred embodiment, the same being illustrated in the accompanying drawings, wherein:

Figure 1 is a side elevation of a transmission mechanism, the near side of the casing being broken away to disclose the internal parts.

Fig. 2 is a transverse section taken on the line 2—2 in Fig. 1, looking in the direction of the arrows.

Fig. 3 is a transverse section taken on line 3—3 of Fig. 1, looking in the direction of the arrows and showing in detail the driven shaft and the parts surrounding the same.

Fig. 4 is a longitudinal section taken through the driven shaft and the parts surrounding the same.

Referring to these drawings, 10 designates the casing or housing which is preferably relatively narrow and high and of suitable length. In the top of the casing and at opposite ends thereof are formed bearings 11 and 12 in which is mounted a drive shaft 13 extending beyond one end of the casing and which may be driven by any suitable means. Mounted upon that portion of the drive shaft 13 located in the casing 10 are a plurality of spur gear wheels 14, 15, 16, and 17 shrunk or otherwise suitably secured thereon, and arranged in suitable spaced apart relation longitudinally of the shaft.

The lower part of the casing 10 has at opposite end bearings 18 and 19 which support a driven shaft which extends longitudinally through the casing 10 and projects from one end of the casing preferably the end opposite from that of the drive shaft 13.

The casing 10 is provided with a plurality of longitudinal spaced apart braces 21, 22 and 23 which may be formed integral with the casing and extend transversely thereof with their intermediate portions reaching outwardly in concentric relation to the driven shaft 20. Each transverse brace is provided with a hanger strip 24 corresponding in width to its adjacent brace and which is curved on a radius corresponding to that on which the arch portions of the transverse braces are curved to form therewith concentric bearings or supports. Surrounding the driven shaft 20 is a plurality of spur gear wheels 25, 26, 27 and 28 which have hubs 29 of relatively large diameter and which are provided with equidistantly spaced apart annular ribs or teeth extending through the entire lengths of the hubs. The hubs 29 extend from opposite sides of the gear wheels and engage in the cylindrical bars formed between the transverse braces and the hangers 24 secured to the braces by bolts 30 or the like. The gear wheels 25, 26 and 27 intermesh at all times with the respective gear wheels 14, 15 and 16. The braces 21, 22, and 23 hold the lower gear wheels in their relative positions. The transverse brace 23 is relatively wide and extends beneath the gear wheel 17 to accommodate a pinion 31 fixed upon a stub shaft 32 which is mounted in a bearing 33 formed upon the adjacent inner end of the casing 10, the pinion 31 meshing at all times with the gear wheel 17. The stub shaft 32 has also fixed thereon a second pinion 34 which meshes at all times with the gear wheel 28 to drive the latter in a reverse direction from that in which the gear wheels 25, 26 and 27 may be driven.

That portion of the driven shaft 20 which extends through the hubs 29 of the lower gear wheels has one or more key-ways 35 formed longitudinally in the sides thereof and adapted to receive the inwardly extending tongues 36 of a collar 37 constituting a shiftable member or carrier. The collar 37 has at one end an annular groove in which is seated a ring 38 secured to the inner end to a link 39, the latter projecting outwardly through one end of the casing 10 and preferably through the hub 29 of the gear wheel 28. This link 39 is pivoted at its outer end to a shifting lever 40 and fulcrumed intermediate its ends upon a link 41 and pivotally mounted upon the adjacent end of the casing 10. Reciprocation of the lever 40 moves the shiftable or interlocking member 37 longitudinally upon the driven shaft 20.

The shiftable connecting member 37 is provided with pairs of outstanding arms 42 which are suitably spaced about the collar or member 37, and are suitably spaced from one another. Fixed from longitudinal movement in each pair of arms 42 is a shaft 43, and arranged between each pair of arms 42, and being of less length than the distance between the arms, is a roller 44 adapted to slide longitudinally upon the shaft 43 to an extent limited by the arms 42. The roller 44 has its periphery convexed longitudinally and provided with longitudinal ribs or teeth spaced apart a distance equal to the spaces between the ribs or teeth formed within the hubs 29.

In operation, all of the various gear wheels intermesh at all times so that no shifting of the gear wheels is required to mesh and separate the teeth thereof. When the transmission mechanism is in neutral position the link 39 is adjusted to position the collar 37 within the relatively broad members 23 so that the rollers 44 of the shiftable member are free of al. of the hubs 29. To obtain the various relative speeds between the drive and driven shafts, it is only necessary to move the shiftable member along the driven shaft 20 and bring the rollers 44 into engagement with the annular ribs within the hubs 29 of the adjacent gear wheels, the shiftable member being held by the link 39 within the desired hub. As the hubs are driven at all times when the drive shaft is in operation the light frictional contact between the adjacent hub and the rollers 44 shifts the latter longitudinally upon their shafts 43 and wedges or binds the rollers toward their adjacent supporting arms 42, effectually binding the shiftable member to the hub, and thus locking the adjacent gear to the driven shaft 20.

It is, of course, understood that when the shiftable member is moved into the hub of the gear wheel 28 the motion of the driven shaft 20 is a reverse one owing to the interposition of the pinions 31 and 34 between the gear wheel 17 of the drive shaft and the gear wheel 28 of the driven shaft.

It is also understood that the mechanism disclosed in the accompanying drawings as associated with the driven shaft may be so arranged with respect to the drive shaft, the same results being produced, and that various other changes and modifications may be made in the details of construction and design without departing from the spirit of this invention, such changes and modifications being restricted only by the scope of the following claims.

I claim:

1. In transmission mechanism, the combination of drive and driven members, one of said members having an internal bearing surface, a shiftable element mounted on the opposite member for engagement within the first member, tangentially shiftable locking devices on said element adapted for engagement with said internal bearing surface and adapted to be shifted upon the relative movement thereof to wedge said locking devices between the members.

2. In transmission mechanism, the combination of drive and driven members, a shiftable element carried by one member adapted to engage an opposite member, rollers mounted on said shiftable element adapted to bear against said opposite member upon the shifting of the element, and means for supporting said rollers for tangential displacement, said rollers being adapted to be displaced by frictional contact with the opposite member upon the relative rotation of the member to interlock the members for turning as a unit.

3. In transmission mechanism, the combination of a drive shaft and driven shaft, a plurality of gear wheels of different diameters fixed upon the drive shaft, a corresponding number of gear wheels of various diameters intermeshing with the first said gear wheels and having relatively large hollow hubs with rows of spaced apart annular ribs therein, means for supporting said hubs concentric to the driven shaft, a shiftable member keyed upon the driven shaft and adapted for movement into and through the hubs, and tangentially movable rollers mounted on said element having ribbed peripheries adapted for rolling contact with the ribbed inner surfaces of the hubs, the frictional contact between the rollers and the hubs being adapted to shift the rollers longitudinally to wedge the same between the shiftable element and the hubs.

4. In transmission mechanism, the combination of a drive shaft, spaced apart gears on the drive shaft, gears meshing with the first gears having hollow hubs, a driven shaft arranged axially through the hubs, a shiftable member keyed to the driven shaft and adapted to be slid thereon into the hubs, pairs of arms projecting from said shiftable element, shafts arranged tangentially in the outer ends of the arms, rollers mounted to turn on the shafts and being of less length than the distance between the arms and adapted to slide longitudinally therebetween, said rollers being adapted for frictional contact with said hubs and to be shifted longitudinally thereby to wedge the rollers between the hubs and the shifting element.

5. In transmission mechanism, the combination of drive and driven members, intermeshing gears associated with said members, a shiftable element on one of said members, bearing devices carried by said element adapted for rolling contact with said gears to reduce frictional contact between the element and the gears during the adjustment of the element into line with the desired gear, a means for supporting said antifriction devices to admit the tangential movement thereof by frictional contact with the gears to wedge the antifriction devices between the gears and the element to interlock the same.

6. In transmission mechanism, the combination of a drive shaft having a plurality of spaced apart gears thereon, a plurality of gears meshing with the first gears, a driven shaft arranged concentric within said second gears, a reverse gear concentric to the driven shaft, pinions connecting the reverse gear to one of said first gears, a shiftable element keyed upon said driven shaft and adapted for longitudinal adjustment into line with said second gears and said reverse gear, rollers on said element for antifriction contact with said last named gears, a supporting means for the rollers to admit a movement of the same into wedging relation between the member and the adjacent gear.

FRANK HEROLD SMITH.